United States Patent
Shimoharai et al.

(10) Patent No.: US 12,221,512 B2
(45) Date of Patent: Feb. 11, 2025

(54) POLYBUTYLENE TEREPHTHALATE RESIN COMPOSITION

(71) Applicant: TOYOBO CO., LTD., Osaka (JP)

(72) Inventors: Takuya Shimoharai, Otsu (JP); Wenli Peng, Otsu (JP)

(73) Assignee: TOYOBO MC CORPORATION, Osaka (JP)

( * ) Notice: Subject to any disclaimer, the term of this patent is extended or adjusted under 35 U.S.C. 154(b) by 490 days.

(21) Appl. No.: 17/433,032

(22) PCT Filed: Feb. 21, 2020

(86) PCT No.: PCT/JP2020/007051
§ 371 (c)(1),
(2) Date: Aug. 23, 2021

(87) PCT Pub. No.: WO2020/175369
PCT Pub. Date: Sep. 3, 2020

(65) Prior Publication Data
US 2022/0153925 A1 May 19, 2022

(30) Foreign Application Priority Data
Feb. 27, 2019 (JP) ................. 2019-033914

(51) Int. Cl.
C08G 63/183 (2006.01)
C08K 3/34 (2006.01)
C08L 67/02 (2006.01)

(52) U.S. Cl.
CPC ............ *C08G 63/183* (2013.01); *C08K 3/34* (2013.01); *C08L 67/025* (2013.01); *C08K 2201/005* (2013.01); *C08L 2201/08* (2013.01); *C08L 2203/30* (2013.01); *C08L 2205/025* (2013.01)

(58) Field of Classification Search
CPC .. C08G 63/183; C08K 2201/005; C08K 3/34; C08L 2201/08; C08L 2203/30; C08L 2205/025; C08L 67/02; C08L 67/025
See application file for complete search history.

(56) References Cited

U.S. PATENT DOCUMENTS

| 2007/0244242 A1 | 10/2007 | Agarwal et al. |
| 2022/0098362 A1 | 3/2022 | Kamiya et al. |

FOREIGN PATENT DOCUMENTS

| EP | 2 813 547 | | 12/2014 |
| JP | 7-53855 | | 2/1995 |
| JP | H0753855 | * | 2/1995 |
| JP | 9-255857 | | 9/1997 |
| JP | 2001-72843 | | 3/2001 |
| JP | 2001-181494 | | 7/2001 |
| JP | 2006152123 | * | 6/2006 |
| JP | 2006-298993 | | 11/2006 |
| JP | 2007262369 | * | 10/2007 |
| JP | 2009-524729 | | 7/2009 |
| JP | 2012-12447 | | 1/2012 |
| JP | 2012012447 | * | 1/2012 |
| JP | 5272715 | | 8/2013 |
| JP | 2014-237822 | | 12/2014 |
| JP | 2016-135831 | | 7/2016 |
| JP | 2018-58231 | | 4/2018 |
| JP | 2018-141108 | | 9/2018 |
| WO | 02/074846 | | 9/2002 |
| WO | 2007/089598 | | 8/2007 |
| WO | 2014/089806 | | 6/2014 |
| WO | 2020/166444 | | 8/2020 |

OTHER PUBLICATIONS

Jing Huang et al "Mechanical properties of thermoplastic polyester elastomer controlled by blending with poly(butylene terephthalate)", Polymer Testing 55 (2016) 152-159 (Year: 2016).*
Manwar Hussain et al "Significant Enhancement of Mechanical and Thermal Properties of Thermoplastic Polyester Elastomer by Polymer Blending and Nanoinclusion", Journal of Nanomaterials, vol. 2016, (Year: 2016).*
Shin et al "Mechanical and Dielectric Breakdown Properties of PBT/TPE, PBT/PBT/PET, and PBT/Antioxidant Blends", Journal of Applied Polymer Science, vol. 114, 3008-3015 (2009 (Year: 2009).*
Gaurav Verma et al "PBT/Thermoplastic Elastomer Blends-Mechanical, Morphological, and Rheological Characterization", Polymer-Plastics Technology and Engineering, 47: 969-977, 2008 (Year: 2008).*
Written Opinion of the International Searching Authority for PCT/JP2020/007051—Translated (Year: 2020).*
Office Action issued Jan. 3, 2023 in Indian Patent Application No. 202117041058.
International Search Report (ISR) issued Apr. 21, 2020 in International (PCT) Application No. PCT/JP2020/007051.
Extended European Search Report issued Nov. 2, 2022 in European Patent Application No. 20763664.8.
Office Action issued Sep. 27, 2022 in Chinese Patent Application No. 202080016010.8, with English-language translation.

(Continued)

*Primary Examiner* — Frances Tischler
*Assistant Examiner* — Gennadiy Mesh
(74) *Attorney, Agent, or Firm* — WENDEROTH, LIND & PONACK, L.L.P.

(57) ABSTRACT

The present invention relates to a polybutylene terephthalate resin composition having excellent heat resistance properties and high toughness, comprising 85 to 99.5 parts by mass of a polybutylene terephthalate resin (A) having an intrinsic viscosity (IV) of 1.0 to 1.3 dl/g, 0 to 13 parts by mass of a polyester elastomer (B), and 0.05 to 2 parts by mass of a talc (C) having an average particle size of 5 μm or less, based on 100 parts by mass in total of components (A), (B) and (C), wherein in the case where the polyester elastomer (B) is contained, the mass ratio of hard segment/soft segment constituting the polyester elastomer (B) is 85/15 to 50/50.

2 Claims, No Drawings

(56) References Cited

OTHER PUBLICATIONS

Hong, Yuerong et al., "Effect of Talc on Crystallization and Thermal Property of PBT", 6th Annual Conference of Chinese Society of Particuology cum Symposium on Particle Technology across Taiwan Straits, East China University of Science and technology, Shanghai, Dec. 8, 2008, pp. 197-200, with English Abstract.
Office Action issued Jun. 20, 2023 in corresponding Japanese Patent Application No. 2021-502188, with English language translation.
Liu, Yingjun et al., "Guide to Modified Plastics Industry: Theory and Practice of Plastic Material Modification and Directory of Enterprises", China Light Industry Press, Sep. 30, 2000, pp. 28-29.

* cited by examiner

POLYBUTYLENE TEREPHTHALATE RESIN COMPOSITION

TECHNICAL FIELD

The present invention relates to a polybutylene terephthalate resin composition. More specifically, the present invention provides a polybutylene terephthalate resin composition having excellent heat resistance properties and high toughness, and suitable for thin-wall molding.

BACKGROUND ART

Due to excellence in mechanical properties, electrical properties, other physical and chemical properties and due to good processability, polybutylene terephthalate resins have been used as an engineering plastic in a wide range of applications for automobiles, electric and electronic parts, etc. In particular, due to the excellent electrical properties, their applications for home appliances, office automation equipment, and automobiles, etc., have a tendency to increase. The growing tendency to make these products lighter, thinner, shorter and smaller is remarkable, and, for example, the outer shell parts thereof are extremely thin.

Further, in order to make a component having a complicated structure, a process for assembling separately formed components afterward is employed in many cases. Examples thereof include a process of making a hook-shaped component and hooking the component through a hole of another component so as to be fixed, and a process of press-fitting a tubular component having a convex part on the outside into another tubular component having a concave part on the inside so as to be fixed through engagement between the convex part and the concave part.

However, since a polybutylene terephthalate resin does not have high toughness, cracks may occur depending on the product shape when assembling thin-walled moldings in some cases. Therefore, there have been limits to the degree of freedom in design of product shape and thickness. In addition, due to increased demand for structures to which load is applied under heated conditions, a material having a high heat deflection temperature (heat deflection temperature of 60° C. or more at 1.8 MPa) has been required to withstand the load.

Therefore, a polybutylene terephthalate resin composition excellent in tensile properties (toughness) has been strongly desired. As a method for improving the tensile properties (toughness) of a polybutylene terephthalate resin, addition of an elastomer is generally known.

In Patent Literature 1, improvement in fluidity, toughness and durability is performed by addition of a polyester elastomer resin and a multi-functional compound having three or more functional groups and one or more alkylene oxide units to a polybutylene terephthalate resin. Further, in Patent Literature 2 and 3, improvement in tensile properties is performed by addition of a polyester elastomer resin to a polybutylene terephthalate resin with a unique blending method. However, no attention is paid to heat resistance (heat deflection temperature) in these compositions, and it is expected that the heat deflection temperature is low.

In Patent Literature 4, compatibility between fluidity and toughness as well as high cycle molding are achieved by addition of a polyester elastomer resin and a talc to a polyethylene terephthalate resin. However, the constitution requires addition of a large amount of elastomer to obtain high tensile elongation, which causes problems of the decrease in heat deflection temperature and the decrease in elastic modulus. These problems can be addressed by addition of a large amount of talc, but in that case, cracking is likely to occur in a thin-walled molding, which is not desirable.

As can be seen from these literature, various studies have been conducted on the improvement of toughness, but improvement studies for compatibility with heat resistance (heat deflection temperature) have not been sufficiently conducted.

CITATION LIST

Patent Literature

PTL 1: Japanese Patent No. 5272715
PTL 2: Japanese Patent Laying-Open No. 2006-298993
PTL 3: Japanese Patent Laying-Open No. 9-255857
PTL 4: Japanese Patent Laying-Open No. 7-53855

SUMMARY OF INVENTION

Technical Problem

The present invention is intended to solve the problems described above, and an object thereof is to provide a polybutylene terephthalate resin composition having excellent heat resistance properties and toughness.

Solution to Problem

The present inventors have completed the present invention as a result of extensive studies on the constitution and properties of a polybutylene terephthalate resin composition in order to solve the problem described above.

In other words, the present invention has the following constitution.

[1] A polybutylene terephthalate resin composition comprising 85 to 99.5 parts by mass of a polybutylene terephthalate resin (A) having an intrinsic viscosity (IV) of 1.0 to 1.3 dl/g, 0 to 13 parts by mass of a polyester elastomer (B) and 0.05 to 2 parts by mass of a talc (C) having an average particle size of 5 μm or less, based on 100 parts by mass in total of components (A), (B) and (C), wherein in the case where the polyester elastomer (B) is contained, a mass ratio of hard segment/soft segment constituting the polyester elastomer (B) is 85/15 to 50/50.

[2] The polybutylene terephthalate resin composition described in [1], wherein the polybutylene terephthalate resin composition comprises 86 to 96 parts by mass of the polybutylene terephthalate resin (A) having an intrinsic viscosity (IV) of 1.0 to 1.3 dl/g and 3 to 13 parts by mass of the polyester elastomer (B).

[3] The polybutylene terephthalate resin composition described in [1] or [2], wherein a molding obtained by injection molding of the polybutylene terephthalate resin composition has a heat deflection temperature of 60° C. or more at 1.8 MPa, after heat treatment at 130° C. for 3 hours.

[4] The polybutylene terephthalate resin composition described in any of [1] to [3], wherein a molding having a thickness of 4 mm obtained by injection molding of the polybutylene terephthalate resin composition has a tensile elongation at break of 50% or more.

Advantageous Effects of Invention

According to the present invention, compatibility between excellent heat resistance properties and toughness is achieved even for a polybutylene terephthalate resin by addition of a polyester elastomer and a talc having a specific particle size at a specific blending ratio.

DESCRIPTION OF EMBODIMENTS

The present invention is specifically described as follows.

Unless otherwise specified, the content (blending amount) of each component in a polybutylene terephthalate resin composition of the present invention is expressed as an amount relative to 100 parts by mass in total of a polybutylene terephthalate resin (A) having an intrinsic viscosity (IV) of 1.0 to 1.3 dl/g, a polyester elastomer (B), and a talc (C) having an average particle size of 5 μm or less. In the present specification, hereinafter, "polybutylene terephthalate resin (A) having an intrinsic viscosity (IV) of 1.0 to 1.3 dl/g" is abbreviated as "polybutylene terephthalate resin (A)", and "talc (C) having an average particle size of 5 μm or less" is abbreviated as "talc (C)". In the present invention, the blending amount (blending ratio) of each component directly represents the content (content ratio) in the polybutylene terephthalate resin composition.

[Polybutylene Terephthalate Resin (A)]

Polybutylene terephthalate resin (A) is a polymer that may be obtained by a conventional polymerization method such as polycondensation reaction between a dicarboxylic acid containing terephthalic acid or an ester-forming derivative thereof as a main component and a diol containing 1,4-butanediol or an ester-forming derivative thereof as a main component. Polybutylene terephthalate resin (A) has a repeating unit of butylene terephthalate in an amount of preferably 80 mol % or more, more preferably 90 mol % or more, still more preferably 95 mol % or more, particularly preferably 100 mol %.

Polybutylene terephthalate resin (A) may contain another polymer component within a range where the properties thereof are not impaired, for example, about 20 mol % or less. Examples of the polybutylene terephthalate resin containing another polymer component include polybutylene (terephthalate/isophthalate), polybutylene (terephthalate/adipate), polybutylene (terephthalate/sebacate), polybutylene (terephthalate/decanedicarboxylate), polybutylene (terephthalate/naphthalate), and poly(butylene/ethylene) terephthalate. These components may be used alone or in combination of two or more.

The intrinsic viscosity (IV) of polybutylene terephthalate resin (A) needs to be 1.0 to 1.3 dl/g. With an intrinsic viscosity (IV) in the range, mechanical properties including tensile properties and chemical properties are improved. The intrinsic viscosity (IV) of polybutylene terephthalate resin (A) is preferably 1.03 to 1.28 dl/g, more preferably 1.05 to 1.25 dl/g, and still more preferably 1.08 to 1.15 dl/g. With an intrinsic viscosity (IV) of less than 1.0 dl/g, sufficient tensile elongation cannot be obtained. With an intrinsic viscosity (IV) of more than 1.3 dl/g, sufficient fluidity cannot be obtained, so that thin-wall molding tends to be difficult.

The amount of terminal carboxyl groups of polybutylene terephthalate resin (A) is not particularly limited. Hydrogen ions dissociated from the terminal carboxyl group play a catalytic role in the hydrolysis reaction of a polyester, so that the hydrolysis reaction is accelerated as the amount of the terminal carboxyl group increases. From this viewpoint, it is preferable that the amount of terminal carboxyl groups be small.

The amount of terminal carboxyl groups of the polybutylene terephthalate resin (A) (acid value) is preferably 40 eq/ton or less, more preferably 30 eq/ton or less, still more preferably 25 eq/ton or less.

The amount of terminal carboxyl groups of polybutylene terephthalate resin (A) (acid value) (unit: eq/ton) may be measured, for example, by dissolving a predetermined amount of polybutylene terephthalate resin in benzyl alcohol and performing titration using 0.01 mol/l benzyl alcohol solution of sodium hydroxide. As indicator, for example, a phenolphthalein solution may be used.

The content of polybutylene terephthalate resin (A) is 85 to 99.5 parts by mass. The content is preferably 86 to 97 parts by mass, more preferably 86 to 96 parts by mass, and still more preferably 87 to 95 parts by mass. Blending polybutylene terephthalate resin (A) within the range can provide a polybutylene terephthalate resin composition having both of heat resistance properties (heat deflection temperature) and high tensile elongation.

[Polyester Elastomer (B)]

It is preferable that polyester elastomer (B) for use in the present invention be a polyester elastomer having a hard segment formed of polyester including an aromatic dicarboxylic acid and an aliphatic and/or alicyclic glycol as constituents, and at least one soft segment selected from an aliphatic polyether, an aliphatic polyester and an aliphatic polycarbonate, with the hard segment being bonded to the soft segment.

In polyester elastomer (B) for use in the present invention, as the aromatic dicarboxylic acid constituting the hard segment polyester, typical aromatic dicarboxylic acids are widely used without particular limitation, and specific examples include terephthalic acid, isophthalic acid, orthophthalic acid, 2,6-naphthalenedicarboxylic acid, 1,5-naphthalenedicarboxylic acid, 1,2-bis(phenoxy)ethane-p,p'-dicarboxylic acid, 4,4'-biphenyldicarboxylic acid, and functional derivatives thereof. Among them, terephthalic acid, isophthalic acid, 2,6-naphthalenedicarboxylic acid, and 4,4'-biphenyldicarboxylic acid are preferred, which tend to have high crystallization rate and good moldability. In particular, terephthalic acid and terephthalic acid dimethyl ester, isophthalic acid and isophthalic acid dimethyl ester, and 2,6-naphthalenedicarboxylic acid and 2,6-naphthalenedicarboxylic acid dimethyl ester are preferred. Further, aliphatic dicarboxylic acids such as adipic acid, sebacic acid, succinic acid, glutaric acid and dimer acid and functional derivatives thereof, and alicyclic dicarboxylic acids such as hexahydroterephthalic acid, hexahydroisophthalic acid and cyclohexanedicarboxylic acid and functional derivatives thereof may be used in an amount of less than 50 mol % in the dicarboxylic acid components constituting the hard segment polyester. The content of components other than aromatic dicarboxylic acids is preferably less than 50 mol %, more preferably less than 40 mol %, still more preferably less than 30 mol %. With a content of components other than aromatic dicarboxylic acids of 50 mol % or more, the crystallinity of the polyester elastomer tends to decrease, and the moldability and heat resistance tend to decrease.

Further, in polyester elastomer (B) for use in the present invention, as the aliphatic or alicyclic glycol constituting the hard segment polyester, typical aliphatic or alicyclic glycols are widely used without particular limitation, and alkylene glycols having 2 to 8 carbon atoms are primarily desirable. Ethylene glycol, 1,3-propylene glycol, 1,4-butanediol, 1,6-hexanediol and 1,4-cyclohexanedimethanol are preferred, and any of ethylene glycol and 1,4-butanediol is particularly preferred.

As a component constituting the hard segment polyester described above, one having an ethylene terephthalate unit (unit composed of terephthalic acid and ethylene glycol) or a butylene terephthalate unit (unit composed of terephthalic acid and 1,4-butanediol) is more preferred from the viewpoints of physical properties, moldability and cost performance.

Further, in the case where an aromatic polyester suitable as a polyester constituting a hard segment in polyester elastomer (B) for use in the present invention is produced in advance and then copolymerized with a soft segment component, the aromatic polyester can be easily obtained according to a typical production method. It is preferable that such a polyester have a number average molecular weight of 10000 to 40000.

The soft segment of polyester elastomer (B) for use in the present invention is at least one selected from an aliphatic polyether, an aliphatic polyester, and an aliphatic polycarbonate. Examples of the aliphatic polyether include polyoxyethylene glycol, polyoxypropylene glycol, polyoxytetramethylene glycol, polyoxyhexamethylene glycol, polyoxytrimethylene glycol, a copolymer of ethylene oxide and propylene oxide, ethylene oxide adduct of polyoxypropylene glycol, and a copolymer of ethylene oxide and tetrahydrofuran.

Examples of the aliphatic polyester include poly(ε-caprolactone), polyenantholactone, polycaprylolactone, and polybutylene adipate.

Further, it is preferable that the aliphatic polycarbonate be mainly formed of an aliphatic diol residue having 2 to 12 carbon atoms. Examples of the aliphatic diol include ethylene glycol, 1,3-propylene glycol, 1,4-butanediol, 1,5-pentanediol, 1,6-hexanediol, 1,8-octanediol, 2,2-dimethyl-1,3-propanediol, 3-methyl-1,5-pentanediol, 2,4-diethyl-1,5-pentanediol, 1,9-nonanediol, and 2-methyl-1,8-octanediol. In particular, from the viewpoints of flexibility and low temperature properties of resulting polyester elastomer (B), an aliphatic diol having 5 to 12 carbon atoms is preferred. Based on the cases described below, these components may be used alone or in combination of two or more on an as needed basis.

In the present invention, an aliphatic polycarbonate diol constituting the usable soft segment of polyester elastomer (B), which has excellent low-temperature properties, has preferably a low melting point (for example, 70° C. or less) and a low glass transition temperature. Generally, an aliphatic polycarbonate diol made of 1,6-hexanediol that is used for forming the soft segment of a polyester elastomer has a low glass transition temperature of about −60° C. and a melting point of about 50° C., so that excellent low-temperature properties are obtained. In addition, an aliphatic polycarbonate diol obtained by copolymerizing the aliphatic polycarbonate diol with, for example, 3-methyl-1,5-pentanediol in an appropriate amount corresponds to an aliphatic polycarbonate diol having excellent low-temperature properties, with a lowered or amorphous melting point, even though having a slightly higher glass transition point in comparison with the original aliphatic polycarbonate diol. Also, for example, an aliphatic polycarbonate diol made of 1,9-nonanediol and 2-methyl-1,8-octanediol corresponds to an aliphatic polycarbonate diol having excellent low-temperature properties, with a melting point of about 30° C. and a glass transition temperature of about −70° C., which are sufficiently low.

It is preferable that polyester elastomer (B) for use in the present invention be a copolymer containing terephthalic acid, 1,4-butanediol, and polyoxytetramethylene glycol as main components due to economy, heat resistance, and cold resistance requirements. In the dicarboxylic acid components constituting polyester elastomer (B), the terephthalic acid content is preferably 40 mol % or more, more preferably 70 mol % or more, still more preferably 80 mol % or more, particularly preferably 90 mol % or more. In the glycol components constituting polyester elastomer (B), the total content of 1,4-butanediol and polyoxytetramethylene glycol is preferably 40 mol % or more, more preferably 70 mol % or more, still more preferably 80 mol % or more, particularly preferably 90 mol % or more.

It is preferable that the number average molecular weight of the polyoxytetramethylene glycol be 500 to 4000. With a number average molecular weight of less than 500, the elastomer properties may be difficult to develop in some cases. On the other hand, with a number average molecular weight of more than 4000, compatibility with a polyester portion constituting the hard segment of polyester elastomer (B) decreases, so that copolymerization in a block form may become difficult in some cases. The number average molecular weight of polyoxytetramethylene glycol is more preferably 800 or more and 3000 or less, still more preferably 1000 or more and 2500 or less.

Regarding the amount of the hard segment and the soft segment of polyester elastomer (B) copolymerized for use in the present invention, the mass ratio of hard segment/soft segment is 85/15 to 50/50. The mass ratio of hard segment/soft segment is preferably 80/20 to 55/45. Setting the amounts of the hard segment and the soft segment of polyester elastomer (B) copolymerized in the range can maintain the heat resistance properties of the polybutylene terephthalate resin composition and provide high toughness (toughness of a thin-walled molding, in particular) at the same time.

The hardness (surface hardness) of polyester elastomer (B) for use in the present invention is not particularly limited, and a polyester elastomer having a Shore hardness in a wide range from low hardness to high hardness, i.e., a Shore D hardness of about 45 to about 75, can be used. One having a Shore D hardness of 50 to 70 is preferred, and one having a Shore D hardness of 55 to 65 is more preferred.

It is preferable that the reduced viscosity of polyester elastomer (B) for use in the present invention be 0.5 dl/g or more and 3.5 dl/g or less in the following measurement method. With a reduced viscosity of less than 0.5 dl/g, durability as a resin is low, and with a reduced viscosity of more than 3.5 dl/g, moldability may be insufficient in some cases. The reduced viscosity of polyester elastomer (B) is more preferably 1.0 dl/g or more and 3.0 dl/g or less, still more preferably 1.3 dl/g or more and 2.8 dl/g or less. Further, the acid value is preferably 200 eq/t or less, more preferably 60 eq/t or less.

Polyester elastomer (B) for use in the present invention can be manufactured by a known method. For example, any of the following methods may be employed: a method of performing transesterification reaction of a lower alcohol diester of dicarboxylic acid, an excess amount of a low molecular weight glycol, and a soft segment component in the presence of a catalyst to polycondensate the resulting reaction products; a method of performing esterification reaction of a dicarboxylic acid, an excess amount of a glycol, and a soft segment component in the presence of a catalyst to polycondensate the resulting reaction products; a method of adding soft segment components to hard segments prepared in advance to cause randomization through transesterification reaction; a method of connecting a hard segment to a soft segment with a chain linking agent; and a method of performing an addition reaction of ε-caprolactone monomer to the hard segment in the case of using poly(ε-caprolactone) as soft segment.

The content of polyester elastomer (B) is 0 to 13 parts by mass. Blending (containing) polyester elastomer (B) within the range can improve tensile properties (toughness) of a polybutylene terephthalate resin composition, while maintaining heat resistance. In the case where polyester elastomer (B) is contained, the mass ratio of hard segment/soft segment needs to be in the specific range described above. Further, in order to improve the tensile properties (toughness) to a level suitable for a thin-walled molding, the content of polyester elastomer (B) is preferably 3 to 13 mass parts by mass. The content of polyester elastomer (B) is more preferably 3 to 12 parts by mass, still more preferably 4 to 11 parts by mass.

[Talc (C)]

The polybutylene terephthalate resin composition of the present invention contains talc (C) having an average particle size of 5 μm or less.

The talc has an effect of a crystal nucleating agent on a polyester resin, and a small amount of addition can improve heat resistance of the polyester resin. However, talc with a large particle size causes a defect in the resin composition, i.e., decrease in tensile elongation. Accordingly, the average particle size of talc (C) for use in the present invention is 5 μm or less. The average particle size (50% size in weight (volume) cumulative particle size distribution) of talc (C) is measured by a laser diffraction method. The average particle size of talc (C) is preferably 3 μm or less. From the viewpoints of suppression of aggregation (poor dispersion) and handleability (ease of feeding, etc.), the lower limit of the average particle size of talc (C) is 0.05 μm.

Regarding talc (C) in the present invention, the production site of raw material talc, production method, component composition, etc., are not particularly limited as long as the average particle diameter range described above is satisfied. Further, the presence or absence of surface treatment of talc (C) in the present invention may be optionally selected without limitation.

Even without surface treatment, talc (C) in the present invention can be sufficiently dispersed in the polypropylene terephthalate resin composition without property degradation. In the case where further enhanced dispersibility is desired, surface treatment may be applied.

In the case where surface treatment is applied to talc (C) in the present invention, for example, a known surface treatment agent such as an organic silane coupling agent, an organic titanate coupling agent, a fatty acid, a metal salt of fatty acid, and a fatty acid ester may be used as surface treatment agent. The surface treatment method of talc (C) is not particularly limited, and examples thereof include a method of physically mixing talc (C) and each of the treatment agents. For example, a mill such as a roll mill, a high-speed rotary mill, and a jet mill, or a mixer such as a Nauta mixer, a ribbon mixer, and a Henschel mixer may be used.

In the present invention, the content of talc (C) is 0.05 to 2 parts by mass, preferably 0.1 to 1.8 parts by mass, and more preferably 0.3 to 1.5 parts by mass. Blending (containing) talc (C) within the range can improve the heat resistance (heat deflection temperature) while maintaining the tensile properties (toughness) of the polybutylene terephthalate resin composition.

[Other Additives]

The polybutylene terephthalate resin composition of the present invention may contain various known additives on an as needed basis, within a range where properties in the present invention are not impaired. Examples of the known additives include a colorant such as a pigment, a mold release agent, a heat resistance stabilizer, an antioxidant, an ultraviolet absorber, a light stabilizer, a plasticizer, a modifier, an antistatic agent, a flame retardant, and a dye.

Examples of the release agent include a long-chain fatty acid or an ester thereof and a metal salt thereof, an amide compound, a polyethylene wax, silicone, and polyethylene oxide. As the long-chain fatty acid, ones having 12 or more carbon atoms are particularly preferred, and examples thereof include stearic acid, 12-hydroxystearic acid, behenic acid, and montanic acid. A part or the whole of carboxylic acid may be esterified with monoglycol or polyglycol, or may form a metal salt. Examples of the amide compound include ethylene bis-terephthalamide and methylene bis-stearylamide. These mold release agents may be used alone or as a mixture.

These various additives may be contained in a total amount of up to 5 parts by mass, based on 100 parts by mass of (A), (B) and (C) in total described above. In the polybutylene terephthalate resin composition, it is preferable that the total amount of (A), (B) and (C) be 95 mass % or more.

[Polybutylene Terephthalate Resin Composition]

A production method for producing the polybutylene terephthalate resin composition of the present invention includes blending the composition in an optional blending sequence, and then mixing the composition with a tumbler or a Henschel mixer for melt-kneading. The melt-kneading method may be any method well known to those skilled in the art with use of a single-screw extruder, a twin-screw extruder, a kneader, a Banbury mixer, a roll, or the like. In particular, use of a twin-screw extruder is preferred. Further, in order to remove a volatile component or a low-molecular component generated through decomposition of the resin during processing, it is desirable to perform suction from a vent port near a die head at the end of extruder by a vacuum pump.

The polybutylene terephthalate resin composition of the present invention allows a molding obtained by injection molding of the polybutylene terephthalate resin composition to have a heat deflection temperature of 60° C. or more at 1.8 MPa, alter heat treatment at 130° C. for 3 hours. The method for measuring the heat deflection temperature is as described in Examples.

The polybutylene terephthalate resin composition of the present invention allows a molding having a thickness of 4 mm obtained by injection molding of the polybutylene terephthalate resin composition to have a tensile elongation at break of 50% or more. The tensile elongation at break is preferably 70% or more, more preferably 100% or more. The method for measuring the tensile elongation at break is as described in Examples.

By further containing a specific amount of polyester elastomer (B), the polybutylene terephthalate resin composition of the present invention allows a molding having a thickness of 0.3 mm obtained by injection molding of the polybutylene terephthalate resin composition to have a tensile elongation at break of 30% or more. The tensile elongation at break is preferably 50% or more, more preferably 60% or more. The method for measuring the tensile elongation at break is as described in Examples.

EXAMPLES

The present invention will be specifically described with reference to Examples and Comparative Examples, though the present invention is not limited thereto. Incidentally, the measured values described in Examples were measured by the following methods.

(1) Intrinsic Viscosity of Polybutylene Terephthalate Resin

In 25 ml of a mixed solvent of phenol/tetrachloroethane (mass ratio: 6/4), 0.1 g of a sample was dissolved and measured at 30° C. using an Ubbelohde viscosity tube. (Unit: dl/g)

(2) Reduced Viscosity of Polyester Elastomer

In 25 ml of a mixed solvent (phenol/tetrachloroethane=60/40 (mass ratio)), 0.05 g of a sample was dissolved and measured at 30° C. using an Ostwald viscometer. (Unit: dl/g)

(3) Add Value of Polybutylene Terephthalate Resin and Polyester Elastomer

In 25 ml of benzyl alcohol, 0.5 g of polybutylene terephthalate resin (polyester elastomer) was dissolved and titrated using 0.01 mol/l benzyl alcohol solution of sodium hydroxide for the measurement. A phenolphthalein solution was used as indicator. (Unit: eq/ton)

(4) Hardness (Surface Hardness) of Polyester Elastomer

Measurement was performed in accordance with JIS K7215 (~1986). As the test piece, a stack of three injection-molded products (length: 100 mm, width: 100 mm, thickness: 2 mm) prepared at a cylinder temperature of 240° C. and a mold temperature of 50° C. was used for the measurement at a measurement pressure of 5000 g, using a durometer with a type-D indenter. The value at 5 seconds after the start of measurement was defined as the D hardness (Shore D hardness).

(5) Heat Deflection Temperature (Load: 1.8 MPa)

In accordance with ISO-75, measurement was performed using an HDT tester (3M-2, manufactured by Toyo Seiki Seisaku-sho, Ltd.). An ISO dumbbell test piece (thickness: 4 mm) was injection molded under conditions at a cylinder temperature of 250° C. and a mold temperature of 50° C., and then cut and heat-treated in a Geer oven under air atmosphere at 130° C. for 3 hours to make a test piece for use. (In the case where crystallization of the polybutylene terephthalate resin composition insufficiently proceeds during injection molding, the heat deflection temperature may be lower (than a value expected from the composition). The heat treatment allows crystallization to sufficiently proceed, so that the deviation between expected value and measured value can be extremely reduced.)

(6) Tensile Elongation at Break (Thickness: 4 mm)

In accordance with ISO-527, a test was performed using an Autograph (AG-IS, manufactured by Shimadzu Corporation), with a load cell of 20 kN, a distance between grips of 115 mm, a distance between marked lined of 50 mm, and a tensile rate of 5 mm/min. The test piece was an ISO dumbbell test piece (thickness: 4 mm) injection molded under conditions at a cylinder temperature of 250° C. and a mold temperature of 50° C.

(7) Tensile Elongation at Break (Thickness: 0.3 mm) (Evaluation of Thin Test Piece)

A test was performed using an Autograph (AG-IS, manufactured by Shimadzu Corporation), with a load cell of 1 kN, a distance between grips of 90 mm, a distance between marked lined of 50 mm, and a tensile rate of 50 mm/min. The test piece was a strip having a length of 125 mm, a width of 13 mm, and a thickness of 0.3 mm injection molded under conditions of a cylinder temperature of 250° C. and a mold temperature of 50° C.

The blended components that were used in Examples and Comparative Examples are shown below.

Polybutylene terephthalate resin (A)

Polybutylene terephthalate resin (A-1): intrinsic viscosity: 1.23 dl/g, acid value: 23 eq/ton Polybutylene terephthalate resin (A-2): intrinsic viscosity: 1.1 dl/g, acid value: 16 eq/ton Polybutylene terephthalate resin (A-3): intrinsic viscosity: 0.92 dl/g, acid value: 12 eq/ton Polybutylene terephthalate resin (A-4): intrinsic viscosity: 0.83 dl/g, acid value: 10 eq/ton Polyester elastomer (B)

Polyester elastomer (B-1) of terephthalic acid (TPA)//1,4-butanediol (BD)/polyoxytetramethylene glycol (PTMG; number average molecular weight: 1000)=100//93/7 (mol %), (mass ratio of hard segment/soft segment=75/25): melting point: 210° C., reduced viscosity: 1.5 dl/g, acid value: 50 eq/ton Polyester elastomer (B-2) of terephthalic acid (TPA)//1,4-butanediol (BD)/polyoxytetramethylene glycol (PTMG; number average molecular weight: 1000)=100//84/16 (mol %), (mass ratio of hard segment/soft segment=57/43): melting point: 198° C., reduced viscosity: 1.9 dl/g, acid value: 35 eq/ton Polyester elastomer (B-3) of terephthalic acid (TPA)//1,4-butanediol (BD)/polyoxytetramethylene glycol (PTMG; number average molecular weight: 1000)=100//72/28 (mol %), (mass ratio of hard segment/soft segment=40/60): melting point: 169° C., reduced viscosity: 2.2 dl/g, acid value: 41 eq/ton Polyester elastomer (B-4) of terephthalic add (TPA)//1,4-butanediol (BD)/polyoxytetramethylene glycol (PTMG; number average molecular weight: 2000)=100//75/25 (mol %), (mass ratio of hard segment/soft segment=30/70): melting point: 177° C., reduced viscosity: 2.5 dl/g, acid value: 28 eq/ton Talc (C): The following average particle size represents a value measured by laser diffraction method (50% size in weight (volume) cumulative particle size distribution)

Talc (C-1) (average particle size: 2.5 μm): Microace SG-95 (manufactured by Nippon Talc Co., Ltd.)

Talc (C-2) (average particle size: 4.0 μm): Microace P-6 (manufactured by Nippon Talc Co., Ltd.)

Talc (C-3) (average particle size: 12.0 μm): Talcum PK-C (manufactured by Hayashi Kasei Co., Ltd.)

Other Additives

Antioxidant: Irganox 1010 (manufactured by BASF)

Release agent: Licolub WE40 (manufactured by Clariant Japan K. K.)

Examples 1 to 7, Comparative Examples 1 to 9

Blending was performed as shown in Table 1. Melt-kneading was performed by a co-rotating twin-screw extruder with a cylinder set at a temperature of 250° C. The resulting strand was water-cooled and pelletized. The resulting pellets were dried at 130° C. for 4 hours for use in each of the evaluation tests described above. The results are shown in Table 1.

TABLE 1

| | | (A-1) Parts by mass | (A-2) Parts by mass | (A-3) Parts by mass | (A-4) Parts by mass | (B-1) Parts by mass | (B-2) Parts by mass | (B-3) Parts by mass | (B-4) Parts by mass | (C-1) Parts by mass | (C-2) Parts by mass | (C-3) Parts by mass | Antioxidant Parts by mass | Mold release agent Parts by mass | Heat deflection temperature (1.8 MPa) °C. | Tensile elongation at break (thickness: 4 mm) % | Tensile elongation at break (thickness: 0.3 mm) % |
|---|---|---|---|---|---|---|---|---|---|---|---|---|---|---|---|---|---|
| Example | 1 | | 99 | | | | | | | 1 | | | 0.2 | 0.5 | 61 | 120 | 10 |
| | 2 | | 94 | | | 5 | | | | 1 | | | 0.2 | 0.5 | 61 | 130 | 80 |
| | 3 | | 89 | | | 10 | | | | 1 | | | 0.2 | 0.5 | 61 | 190 | 105 |
| | 4 | | 89 | | | 10 | | | | | 1 | | 0.2 | 0.5 | 63 | 155 | 70 |
| | 5 | 89 | | | | 10 | | | | 1 | | | 0.2 | 0.5 | 60 | 205 | 110 |
| | 6 | | 89.5 | | | 10 | | | | 0.5 | | | 0.2 | 0.5 | 60 | 200 | 112 |
| | 7 | | 94 | | | | 5 | | | 1 | | | 0.2 | 0.5 | 60 | 135 | 70 |
| Comparative Example | 1 | | | 99 | | | | | | 1 | | | 0.2 | 0.5 | 63 | 28 | 7 |
| | 2 | | | | 99 | | | | | 1 | | | 0.2 | 0.5 | 67 | 8 | 5 |
| | 3 | | 100 | | | | | | | | | | 0.2 | 0.5 | 55 | 120 | 10 |
| | 4 | | 95 | | | 5 | | | | | | | 0.2 | 0.5 | 55 | 130 | 80 |
| | 5 | | 99 | | | | | | | | | 1 | 0.2 | 0.5 | 61 | 34 | 5 |
| | 6 | | 95 | | | | | | 5 | | | | 0.2 | 0.5 | 65 | 5 | 3 |
| | 7 | | 94 | | | | | 5 | | 1 | | | 0.2 | 0.5 | 67 | 140 | 36 |
| | 8 | | 94 | | | | | | 5 | 1 | | | 0.2 | 0.5 | 56 | 150 | 40 |
| | 9 | | 84 | | | 15 | | | | 1 | | | 0.2 | 0.5 | 57 | 220 | 121 |

As shown in Table 1, the polybutylene terephthalate resin compositions in Examples 1 to 7 of the present invention with use of a polybutylene terephthalate resin having an intrinsic viscosity within a specific range, containing a polyester elastomer and a talc having a specific particle size at a specified blending ratio, achieved compatibility between high heat deflection temperature and tensile elongation at break. Further, it can be seen that in the case where the polyester elastomer is contained, even a thin-walled test piece having a thickness of 0.3 mm has high tensile elongation at break.

In Comparative Examples 1 to 9, the specified ranges in the present invention were not satisfied, so that either one or both of the heat deflection temperature and the tensile elongation at break were low.

INDUSTRIAL APPLICABILITY

According to the present invention, a polybutylene terephthalate resin composition having excellent heat resistance properties and high toughness can be obtained, which can be suitably used for applications requiring precision molding, enabling improvement in the degree of freedom of shape through assembling of a plurality of components, thinning of products, and weight reduction easily, which will greatly contribute to the industry.

The invention claimed is:

1. A polybutylene terephthalate resin composition comprising 86 to 96 parts by mass of a polybutylene terephthalate resin (A) having an intrinsic viscosity (IV) of 1.0 to 1.3 dl/g, 3 to 13 parts by mass of a polyester elastomer (B) having a reduced viscosity of 0.5 to 3.5 dl/g, and 0.05 to 2 parts by mass of a talc (C) having an average particle size of 5 μm or less, based on 100 parts by mass in total of components (A), (B) and (C), wherein a mass ratio of hard segment/soft segment constituting the polyester elastomer (B) is 85/15 to 50/50, and wherein the polybutylene terephthalate resin composition used for an article having a thickness of 0.3 mm obtained by injection molding has a tensile elongation at break of 60% or more.

2. The polybutylene terephthalate resin composition according to claim 1, wherein a molding obtained by injection molding of the polybutylene terephthalate resin composition has a heat deflection temperature of 60° C. or more at 1.8 MPa, after heat treatment at 130° C. for 3 hours.

* * * * *